US012722432B2

(12) United States Patent
Zhao

(10) Patent No.: US 12,722,432 B2
(45) Date of Patent: Sep. 1, 2026

(54) TOW ROPE

(71) Applicant: Jing Zhao, Shanghai (CN)

(72) Inventor: Jing Zhao, Shanghai (CN)

( * ) Notice: Subject to any disclaimer, the term of this patent is extended or adjusted under 35 U.S.C. 154(b) by 0 days.

(21) Appl. No.: 19/558,423

(22) Filed: Mar. 5, 2026

(65) Prior Publication Data

US 2026/0192616 A1 Jul. 9, 2026

(30) Foreign Application Priority Data

Feb. 12, 2026 (CN) ........................ 202610211156.7

(51) Int. Cl.
*B60D 1/18* (2006.01)

(52) U.S. Cl.
CPC ................ *B60D 1/187* (2013.01); *B60D 1/18* (2013.01)

(58) Field of Classification Search
CPC ..................................................... B60D 1/187
See application file for complete search history.

(56) References Cited

U.S. PATENT DOCUMENTS 1,168,802 A * 1/1916 Harrison .................. B66C 1/18 294/74
D1,017,479 S * 3/2024 Lou ............................. D12/162
11,965,288 B2 * 4/2024 De Jager ................ D07B 1/185
2015/0351739 A1 * 12/2015 Napolitano ............. D07B 1/18 606/228
2017/0353017 A1 * 12/2017 Ward ....................... D07B 1/18
2021/0213790 A1 7/2021 Boraggina
2022/0178074 A1 * 6/2022 Pavel ...................... B66C 1/122
2023/0339576 A1 10/2023 Lewis
2025/0162360 A1 5/2025 Yu et al.

* cited by examiner

*Primary Examiner* — Valentin Neacsu
*Assistant Examiner* — Marlon A Arce
(74) *Attorney, Agent, or Firm* — Shen Huang

(57) ABSTRACT

A tow rope, including: a rope main body, a first loop is connected to a first crossing point, a second loop is formed at and connected to a second crossing point. At least one of the first loop and the second loop is configured to be secured to one of an object to be towed and a towing device. A distance between an end of the first loop remote from the third crossing point and the third crossing point is bigger than a distance between an end of the second loop remote from the third crossing point and the third crossing point. A knot assembly is releasably engaged with a ring assembly to form a third loop, and the third loop is configured to selectively connect to another one of the object to be towed and the towing device, the first loop, or the second loop.

17 Claims, 10 Drawing Sheets

TOW ROPE

CROSS-REFERENCE TO RELATED APPLICATIONS

This application claims foreign priority of Chinese Patent Application No. 2026102111567, filed on Feb. 12, 2026 in the China National Intellectual Property Administration, the disclosures of all of which are hereby incorporated by reference.

TECHNICAL FIELD

The present disclosure relates to the technical field of ropes, in particular to a tow rope.

BACKGROUND

In fields such as fisheries, mining, animal husbandry, vehicle towing, and rescue operations, ropes or cables are frequently employed as tow elements. Conventionally, users secure a rope by directly knotting or lashing it around a connecting ring or a connecting hook. However, such direct attachment is not only cumbersome and time-consuming but also prone to loosening or detachment during use, thereby causing inconvenience and potential safety hazards to the user.

To facilitate easier connection, many existing tow rope products incorporate pre-formed loops (splices or grommets) at both ends, enabling the user to readily attach the tow rope to a connecting ring or hook. Nevertheless, such conventional products suffer from a significant limitation: the length of the rope is fixed. Once the two loops are respectively connected to the towing device and the object to be towed, the effective length of the rope extending therebetween remains constant and cannot be adjusted. In many practical scenarios, this fixed length proves inconvenient, as it fails to accommodate varying distances between the towing device and the towed object, resulting in poor adaptability and limited applicability.

SUMMARY

To overcome the shortcomings of the prior art, the present disclosure provides a tow rope having a simple structure and capable of meeting diverse user requirements To realize the above objective, the present disclosure provides a tow rope, including: a rope main body having a first crossing point, a second crossing point, and a third crossing point; a first loop is formed at and connected to the first crossing point, a second loop is formed at and connected to the second crossing point; wherein at least one of the first loop and the second loop is configured to be secured to one of an object to be towed and a towing device; wherein a distance between an end of the first loop remote from the third crossing point and the third crossing point is L1, and a distance between an end of the second loop remote from the third crossing point and the third crossing point is L2, with L1>L2; a ring assembly connected to the third crossing point; a knot assembly connected to the third crossing point and arranged adjacent to the ring assembly; wherein the knot assembly is releasably engaged with the ring assembly to form a third loop, and the third loop is configured to selectively connect to another one of the object to be towed and the towing device, the first loop, or the second loop; wherein, when the third loop is connected to the first loop, the first loop, a first rope segment of the rope main body, and the third loop together enclose and form a fourth loop, and wherein the fourth loop is configured to be secured to another one of the object to be towed and the towing device; wherein, when the third loop is connected to the second loop, the second loop, a second rope segment of the rope main body, and the third loop together enclose and form a fifth loop, and wherein the fifth loop is configured to be secured to another one of the object to be towed and the towing device.

Furthermore, the rope main body is formed by braiding a plurality of strands, and the rope main body is substantially cylindrical in shape.

Furthermore, the plurality of strands comprises a plurality of first strands made of a first material and a plurality of second strands made of a second material; wherein the plurality of first strands is braided to form an inner core, the plurality of second strands is braided to form a sheath, and the inner core is disposed inside the sheath.

Furthermore, a ratio of L1 to L2 is in a range of 1.5 to 1.9.

Furthermore, the ring assembly comprises an eye loop and a first neck connection part, the knot assembly comprises a knot and a second neck connection part; wherein a first end of the first neck connection part is connected to the rope main body, and a second end of the first neck connection part extends outwardly from the third crossing point and is connected to the eye loop; wherein a first end of the second neck connection part is connected to the rope main body, and a second end of the second neck connection part extends outwardly from the third crossing point and is connected to the knot; wherein the knot is configured to be releasably passed through the eye loop.

Furthermore, an inner perimeter of the eye loop is approximately equal to an outer perimeter of the knot.

Furthermore, the knot assembly further comprises a pulling portion, and the pulling portion is connected to the knot and extends outwardly in a direction away from the second neck connection part.

Furthermore, a diameter of the pulling portion and a diameter of the second neck connection part are both smaller than a diameter of the knot.

Furthermore, a first end of the rope main body is inserted into the sheath at the first crossing point through a gap between two adjacent second strands, thereby leading a portion of the rope main body between the first end and the first crossing point to form the first loop.

Furthermore, a second end of the rope main body is inserted into the sheath at the second crossing point through a gap between two adjacent second strands, thereby leading a portion of the rope main body between the second end and the second crossing point to form the second loop.

Furthermore, the ring assembly is made of a noose rope body, the noose rope body is formed by braiding a plurality of third strands; the noose rope body comprises a first end, a second end, and a fourth crossing point; wherein the first end of the noose rope body is inserted into the noose rope body at the fourth crossing point through a gap between two adjacent third strands, thereby forming the eye loop.

Furthermore, the second end of the noose rope body is inserted into the sheath and the inner core at the third crossing point through a gap between two adjacent second strands and a gap between two adjacent first strands, thereby leading a portion of the noose rope body between the third crossing point and the fourth crossing point to form the first neck connection part.

Furthermore, the knot assembly comprise a first knot rope body and a second knot rope body, both the first knot rope body and the second knot rope body are formed by braiding a plurality of fourth strands; wherein the first knot rope body comprises a first end, a second end, and a fifth crossing point; the second knot rope body comprises a first end and a second end; wherein the first knot rope body and the second knot rope body are knotted together to form the knot; and a portion between the first end of the first knot rope body and the knot together with a portion between the first end of the second knot rope body and the knot jointly form the pulling portion.

Furthermore, the second end of the second knot rope body is inserted into the first knot rope body at the fifth crossing point through a gap between two adjacent fourth strands.

Furthermore, the second end of the first knot rope body is inserted into the sheath and the inner core at the third crossing point through a gap between two adjacent second strands and a gap between two adjacent first strands, thereby allowing a portion between the first knot rope body and the second knot rope body and a portion between the third crossing point and the fifth crossing point to form the second neck connection part.

Furthermore, at least one of the first end of the first knot rope body and the first end of the second knot rope body is provided with a wrapping tape, the wrapping tape is configured to connect the first end of the first knot rope body and the first end of the second knot rope body.

Furthermore, a surface of the rope main body is coated with a coating layer; wherein the coating layer comprises at least one of waterborne polyurethane, waterborne acrylic resin, waterborne polyester resin, waterborne silicone-containing resin, waterborne fluorine-containing resin, waterborne amino resin, waterborne alkyd resin, waterborne epoxy resin, waterborne phenolic resin, waterborne oil, waterborne polybutadiene, and waterborne hyperbranched polymer.

During use, the user may selectively adopt different connection modes according to specific operational needs, thereby accommodating various distance requirements between the towing device and the object to be towed.

Specifically, when a distance between the towing device and the object to be towed is relatively large, the user may connect a first loop and a second loop respectively to the corresponding connecting components (e.g., hooks) on the towing device and the object to be towed. In this configuration, the effective distance between the towing device and the object to be towed is substantially equal to the total length of the rope main body, that is, L1+L2.

When the distance between the towing device and the object to be towed is relatively short, the user may connect either the first loop or the second loop to one of the towing device or the object to be towed, while connecting a knot assembly to a ring assembly so as to form a third loop, and then attaching the third loop to the other of the towing device or the object to be towed. In this configuration, the effective distance between the towing device and the object to be towed is substantially equal to the length L1 of a first rope segment or the length L2 of a second rope segment.

When the distance between the towing device and the object to be towed is greater than L1 but less than L1+L2, the user has two alternative connection options: the second loop is selectively connected to the towing device or the object to be towed; the third loop is connected through (or interlinked with) the first loop so as to form a fourth loop; and the fourth loop is then connected to the other of the towing device or the object to be towed. In this configuration, the effective distance between the towing device and the object to be towed is substantially equal to 0.5L1+L2.

Alternatively, the first loop is selectively connected to the towing device or the object to be towed; the third loop is connected through (or interlinked with) the second loop so as to form a fifth loop; and the fifth loop is then connected to the other of the towing device or the object to be towed. In this configuration, the effective distance between the towing device and the object to be towed is substantially equal to L1+0.5L2.

Accordingly, by virtue of the aforementioned structural arrangement, the user can freely select an appropriate connection mode depending on the actual distance requirement, thereby achieving flexible adjustment of the effective traction length and greatly enhancing the adaptability and practicality of the tow rope.

BRIEF DESCRIPTION OF DRAWINGS

In order to more clearly illustrate the technical solutions of the embodiments of the present disclosure, a brief description of the drawings required for use in the description of the embodiments is provided below. The drawings described hereinafter are merely exemplary embodiments of the present disclosure. For those of ordinary skill in the art, other drawings may be obtained from these drawings without the exercise of inventive effort.

DETAILED DESCRIPTION OF THE EMBODIMENTS

Figure 1:
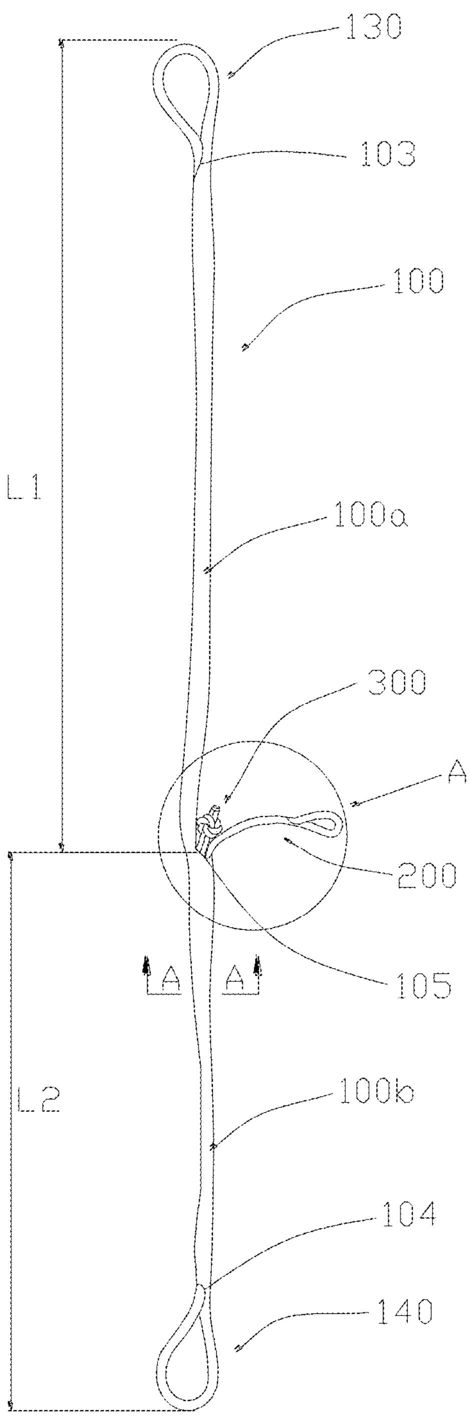
FIG. 1 is a schematic structural diagram of a first usage state of a tow rope according to an embodiment of the present disclosure.

To make the above-mentioned objects, features, and advantages of the present disclosure more apparent and readily understandable, specific embodiments of the present disclosure are described in detail below with reference to the accompanying drawings.

In the following description, numerous specific details are set forth in order to provide a thorough understanding of the present disclosure. However, the present disclosure may be embodied in many other ways different from those described herein, and persons skilled in the art may make similar modifications without departing from the spirit and scope of the present disclosure. Therefore, the present disclosure is not limited to the specific embodiments disclosed below.

In the description of the present disclosure, it is to be understood that, where the terms "center," "longitudinal," "lateral," "length," "width," "thickness," "upper," "lower," "front," "rear," "left," "right," "vertical," "horizontal," "top," "bottom," "inner," "outer," "clockwise," "counter-clockwise," "axial," "radial," "circumferential," and the like appear, these terms indicate orientations or positional relationships based on the orientations or positional relationships shown in the drawings, merely for convenience in describing the present disclosure and simplifying the description, and do not indicate or imply that the referred device or element must have a particular orientation, be constructed and operated in a particular orientation, and therefore should not be construed as limiting the present disclosure.

Furthermore, when the terms "first" and "second" appear, they are used merely for descriptive purposes and are not to be construed as indicating or implying relative importance or implicitly specifying the number of the indicated technical features. Thus, features defined as "first" or "second" may explicitly or implicitly include at least one such feature. In the description of the present disclosure, unless otherwise expressly and specifically limited, the term "plurality" or "a plurality of" means at least two (e.g., two, three, etc.).

In the present disclosure, unless otherwise expressly specified and limited, terms such as "mounted," "connected," "coupled," "fixed," and the like shall be understood in a broad sense. For example, they may refer to a fixed connection, a detachable connection, or an integral connection; they may refer to a mechanical connection or an electrical connection; they may refer to a direct connection or an indirect connection via an intermediate medium; they may refer to internal communication between two elements or an interaction relationship between two elements, unless otherwise expressly limited. For those of ordinary skill in the art, the specific meanings of the above terms in the context of the present disclosure can be understood according to specific circumstances.

In the present disclosure, unless otherwise expressly specified and limited, when a first feature is described as being "on" or "under" a second feature or similar expressions appear, it may mean that the first and second features are in direct contact, or that the first and second features are in indirect contact via an intermediate medium. Moreover, the first feature being "above," "over," or "on top of" the second feature may mean that the first feature is directly above or obliquely above the second feature, or merely that the horizontal height of the first feature is greater than that of the second feature. The first feature being "below," "under," or "beneath" the second feature may mean that the first feature is directly below or obliquely below the second feature, or merely that the horizontal height of the first feature is less than that of the second feature.

It should be noted that when an element is referred to as being "fixed to" or "disposed on" another element, it may be directly on the other element or an intervening element may be present. When an element is referred to as being "connected to" another element, it may be directly connected to the other element or an intervening element may be present simultaneously. Where such intervening elements exist, the terms "vertical," "horizontal," "upper," "lower," "left," "right," and similar expressions used in the present disclosure are for illustrative purposes only and are not intended to represent the only possible implementation.

Referring to FIGS. 1 to 7, a tow rope, including a rope main body 100, a ring assembly 200 and a knot assembly.

The rope main body 100 has a first crossing point 103, a second crossing point 104, and a third crossing point 105. A first loop 130 is formed at and connected to the first crossing point 103. A second loop 140 is formed at and connected to the second crossing point 104.

At least one of the first loop 130 and the second loop 140 is configured to be secured to one of an object to be towed and a towing device.

A distance between an end of the first loop 130 remote from the third crossing point 105 and the third crossing point 105 is L1, and a distance between an end of the second loop 140 remote from the third crossing point 105 and the third crossing point 105 is L2, with L1>L2.

A ring assembly 200 is connected to the third crossing point 105. A knot assembly 300 is connected to the third crossing point 105 and arranged adjacent to the ring assembly 200.

The knot assembly 300 is releasably engaged with the ring assembly 200 to form a third loop 230, and the third loop 230 is configured to selectively connect to another one of the object to be towed and the towing device, the first loop 130, or the second loop 140.

When the third loop 230 is connected to the first loop 130, the first loop 130, a first rope segment **100*a* of the rope main body 100, and the third loop 230 together enclose and form a fourth loop, and the fourth loop 233** is configured to be secured to another one of the object to be towed and the towing device.

When the third loop 230 is connected to the second loop 140, the second loop 140, a second rope segment **100*b* of the rope main body, and the third loop 230 together enclose and form a fifth loop 234, and wherein the fifth loop 234** is configured to be secured to another one of the object to be towed and the towing device.

In this embodiment, the towing device can be a specific equipment with towing function, such as rescue vehicles, trailers, cranes, robotic arms, etc. The object to be towed include any items that require external force to move, such as cars, ships, trains or train cars, motorcycles, etc. The towing device and the object to be towed are equipped with components such as hooks, which facilitate connection with the towing rope.

In use, a user can select different connection configurations according to actual usage requirements so as to accommodate different distance requirements between the towing device and the object being towed.

Specifically, when the distance between the towing device and the object being towed is relatively far, the user may connect the first loop 130 and the second loop 140 to a connecting part of the object to be towed (e.g., hook) and a connecting part of the towing device, respectively, at this time, the distance between the towing device and the object being towed is approximately equal to an overall length of the rope main body 100, that is, approximately L1+L2 (as shown in FIG. 1).

Figure 4:
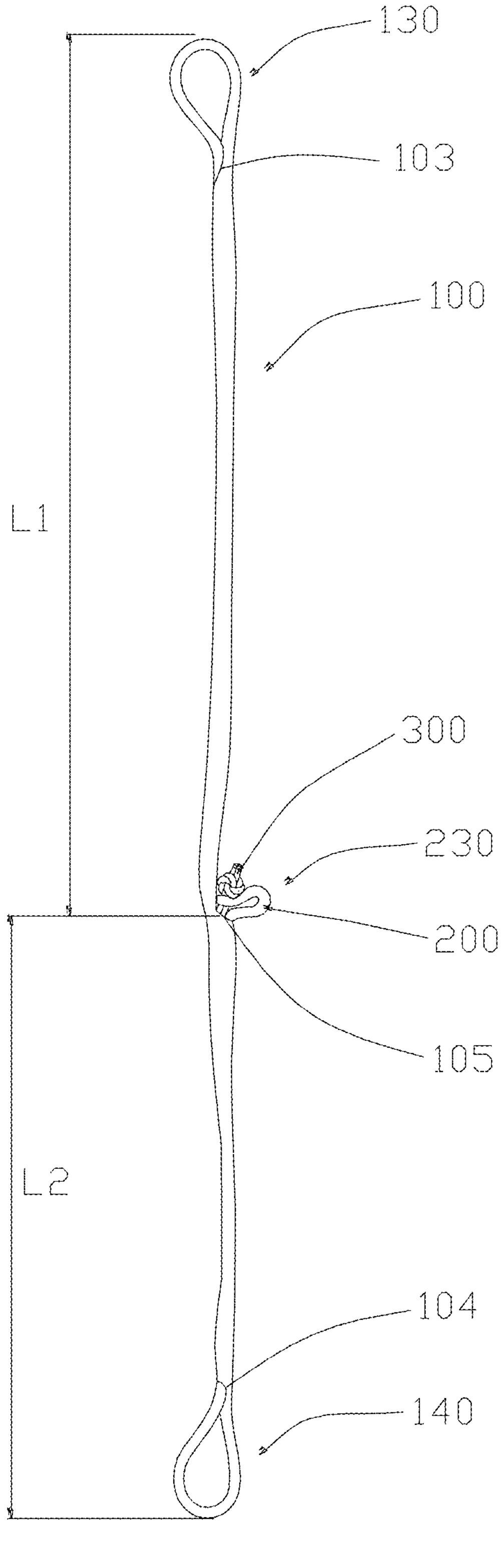
FIG. 4 is a schematic structural diagram of a second usage state of the tow rope according to an embodiment of the present disclosure.

When the distance between the towing device and the object being towed is relatively close, the user may connect one of the first loop 130 and the second loop 140 to one of the towing device and the object being towed. Forming the third loop 230 by connecting the knot assembly 300 with the ring assembly 200, and then connect the third loop 230 to the other of the towing device and the object being towed. At this time, the distance between the towing device and the object being towed is approximately equal to the length L1 of the first rope segment 100*a* or the length L2 of the second rope segment 100*b* (as shown in FIG. 4).

Figure 5:
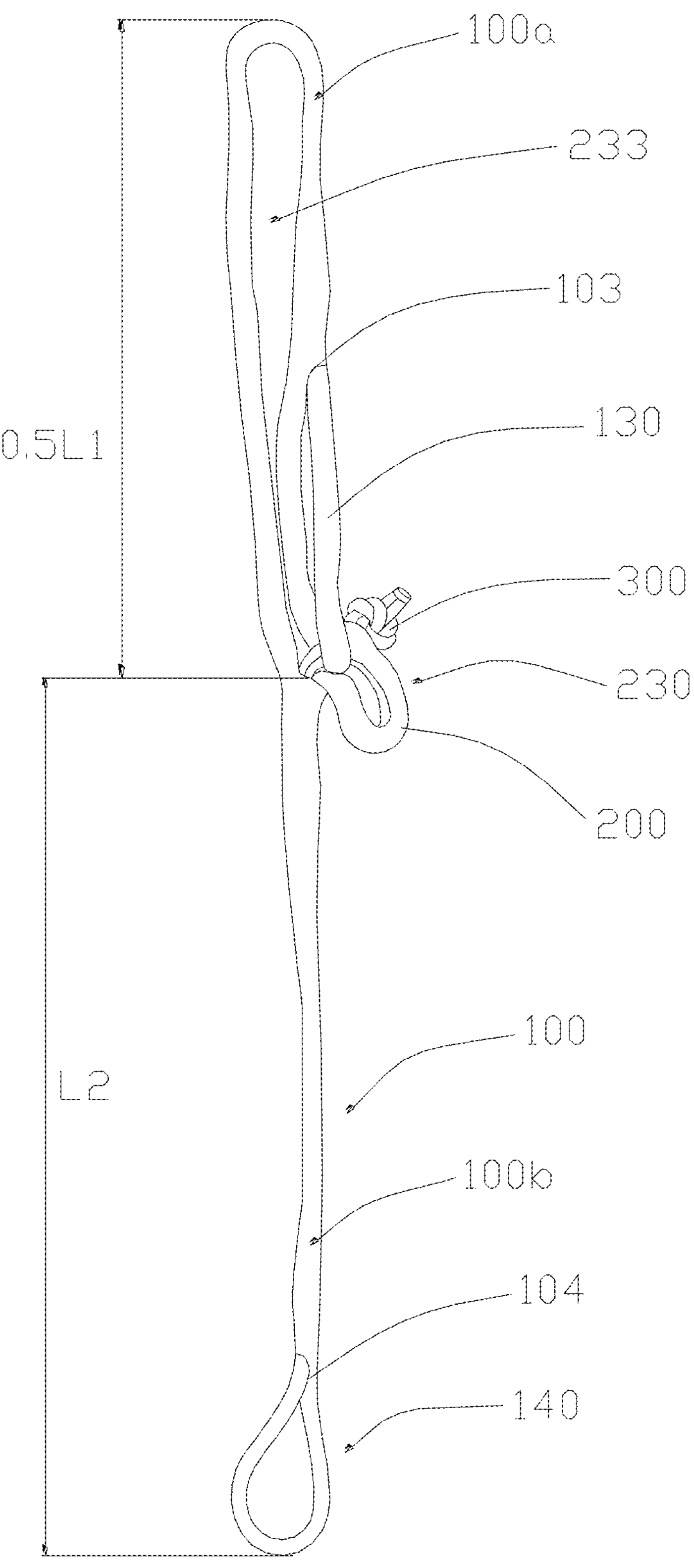
FIG. 5 is a schematic structural diagram of a third usage state of the tow rope according to an embodiment of the present disclosure.
Figure 6:
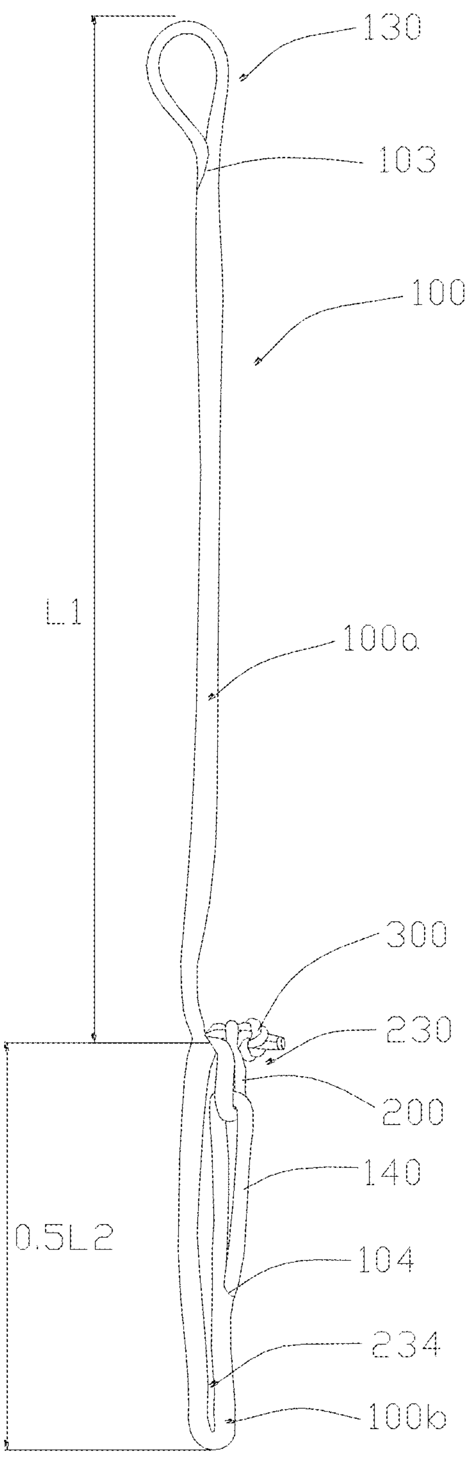
FIG. 6 is a schematic structural diagram of a fourth usage state of the tow rope according to an embodiment of the present disclosure.

When the distance between the towing device and the object being towed is greater than L1 but less than L1+L2, the user may connect the second loop 140 to one of the towing device and the object being towed, connect the third loop 230 to the first loop 130 so as to form the fourth loop 233. And connecting the fourth loop 233 to the other of the towing device and the object being towed. At this time, the distance between the towing device and the object being towed is approximately equal to L1+0.5L2 (as shown in FIG. 5). Alternatively, the user may connect the first loop 130 to one of the towing device and the object being towed. Connecting the third loop 230 to the second loop 140 so as to form the fifth loop 234, and connecting the fifth loop 234 to the other of the towing device and the object being towed. At this time, the distance between the towing device and the object being towed is approximately equal to L1+0.5L2 (as shown in FIG. 6).

Accordingly, the user can freely select different connection modes according to specific needs, thereby satisfying the requirements for using the tow rope of different effective lengths.

Figure 3:
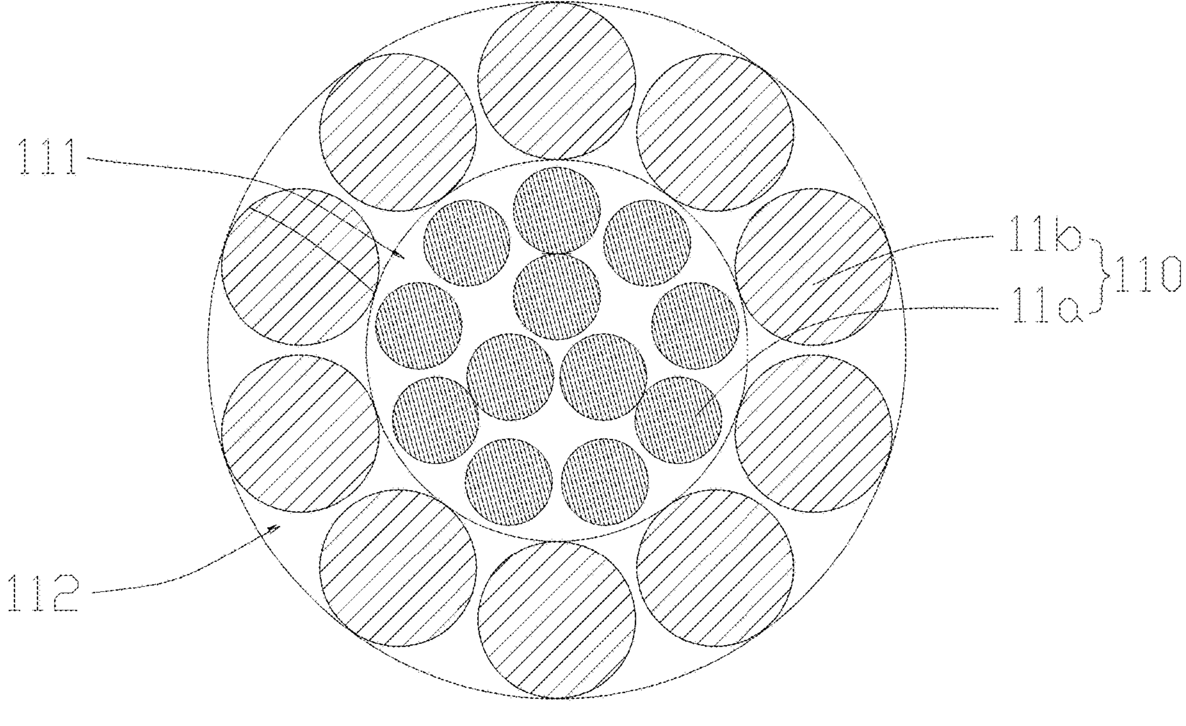
FIG. 3 is a cross-sectional view of a main rope body of the tow rope according to an embodiment of the present disclosure.

In this embodiment, as shown in FIG. 3, the rope main body 100 is formed by braiding a plurality of strands 110, and the rope main body 100 is substantially cylindrical in shape.

In this embodiment, the plurality of strands 110 includes a plurality of first strands 11*a* made of a first material and a plurality of second strands 11*b* made of a second material. The first strands 11*a* are braided to form an inner core 111, the plurality of second strands 11*b* is braided to form a sheath 112, and the inner core 111 is disposed inside the sheath 112.

The plurality of first strands 11*a* is typically formed by twisting materials having high tensile strength, for example, at least one selected from the group consisting of ultra-high molecular weight polyethylene fiber, carbon fiber, nylon fiber, polyester fiber, polypropylene fiber, polyamide fiber, and aramid fiber. The plurality of second strands 11*b* is typically formed by twisting materials having high abrasion resistance. For example, at least one selected from the group consisting of ultra-high molecular weight polyethylene fiber, aramid fiber, polyetheretherketone fiber, polyphenylene sulfide fiber, carbon fiber, nylon fiber, polyester fiber, polypropylene fiber, and glass fiber.

The sheath 112 formed by braiding the second strands 11*b* exhibits excellent abrasion resistance and can effectively protect the inner core 111. The inner core 111 formed by braiding the plurality of first strands 11*a* possesses high tensile strength, enabling the product to withstand greater loads. The combination of both achieves a balance among strength, durability, and functionality.

In this embodiment, the ratio of L1 to L2 ranges from 1.5 to 1.9. Preferably, the ratio of L1 to L2 is 1.8. For example, when L1 is 2.5 meters and L2 is 1.5 meters, different usage configurations can be combined to provide five available working lengths: 1.5 m, 2.5 m, 2.75 m, 3.25 m, and 4 m. This enhances the adaptability of the product, enabling it to be applied to a wider variety of usage scenarios and satisfying diverse user requirements.

Figure 2:
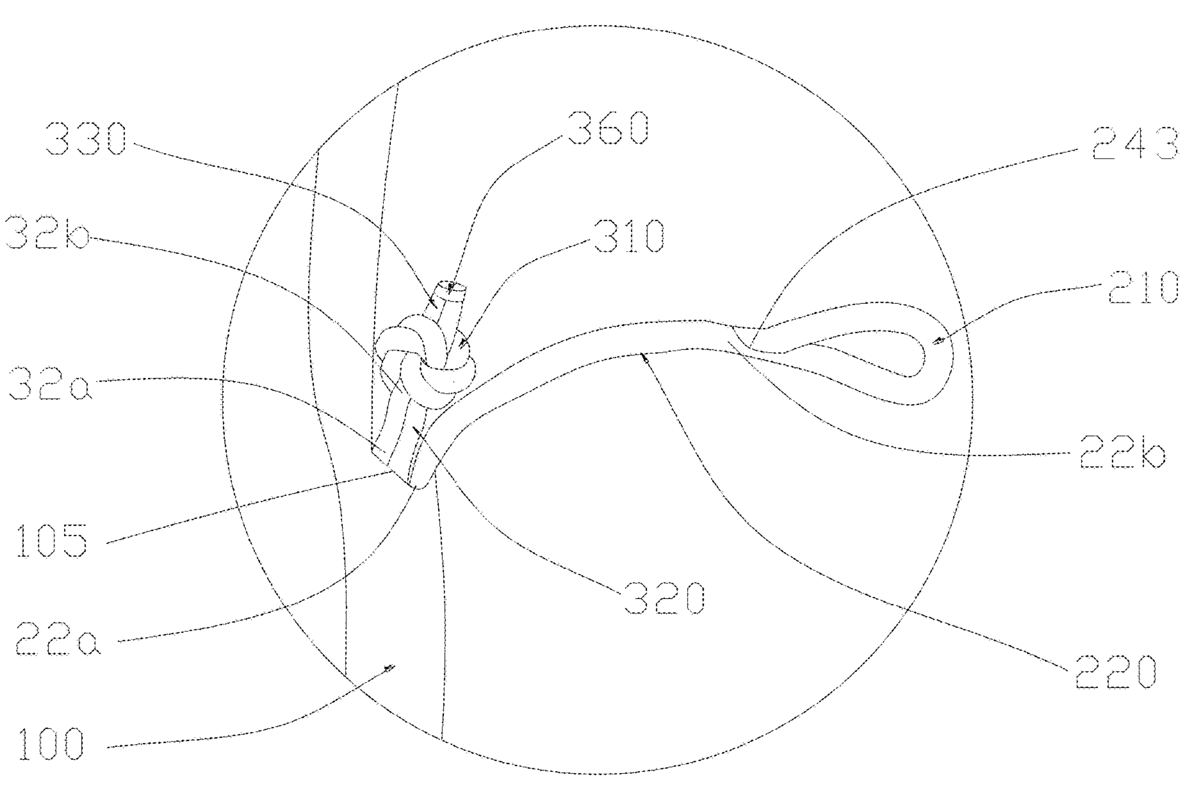
FIG. 2 is an enlarged view of an area A in FIG. 1.

In this embodiment, as shown in FIG. 2, the ring assembly 200 includes an eye loop 210 and a first neck connection part 220, and the knot assembly 300 comprises a knot 310 and a second neck connection part 320. A first end 22*a* of the first neck connection part 220 is connected to the rope main body 100, and a second end 22*b* of the first neck connection part

220 extends outwardly from the third crossing point 105 and is connected to the eye loop 210. A first end 32*a* of the second neck connection part 320 is connected to the rope main body 100, and a second end 32*b* of the second neck connection part 320 extends outwardly from the third crossing point 105 and is connected to the knot 310. The knot 310 is configured to be releasably passable through the eye loop 210.

In use, when the knot 310 is passed through the eye loop 210, the eye loop 210 abuts against the second end 32*b* of the second neck connection part 320 and the lower surface of the knot 310, while the first neck connection part 220 is bent to form a third loop 230. Both connection and disconnection are convenient, and the eye loop 210 and the knot 310 are not prone to accidental disengagement, thereby improving safety during use of the product.

In this embodiment, an inner edge perimeter of the eye loop 210 is substantially equal to an outer edge perimeter of the knot 310. When connecting the ring assembly 200 and the knot assembly 300, the eye loop 210 undergoes deformation such that its inner edge assumes a substantially circular shape, which just allows the knot 310 to pass through. During actual use of the tow rope, when subjected to tensile force, the inner edge of the eye loop 210 deforms into a flattened, substantially elliptical shape. In this state, it becomes extremely difficult for the knot 310 to pass back through, thereby effectively preventing unintended release and providing more stable performance during use.

In this embodiment, the knot assembly 300 further comprises a pulling portion 330, the pulling portion 330 is connected to the knot 310 and extends outwardly in a direction away from the second neck connection part 320.

Figure 9:
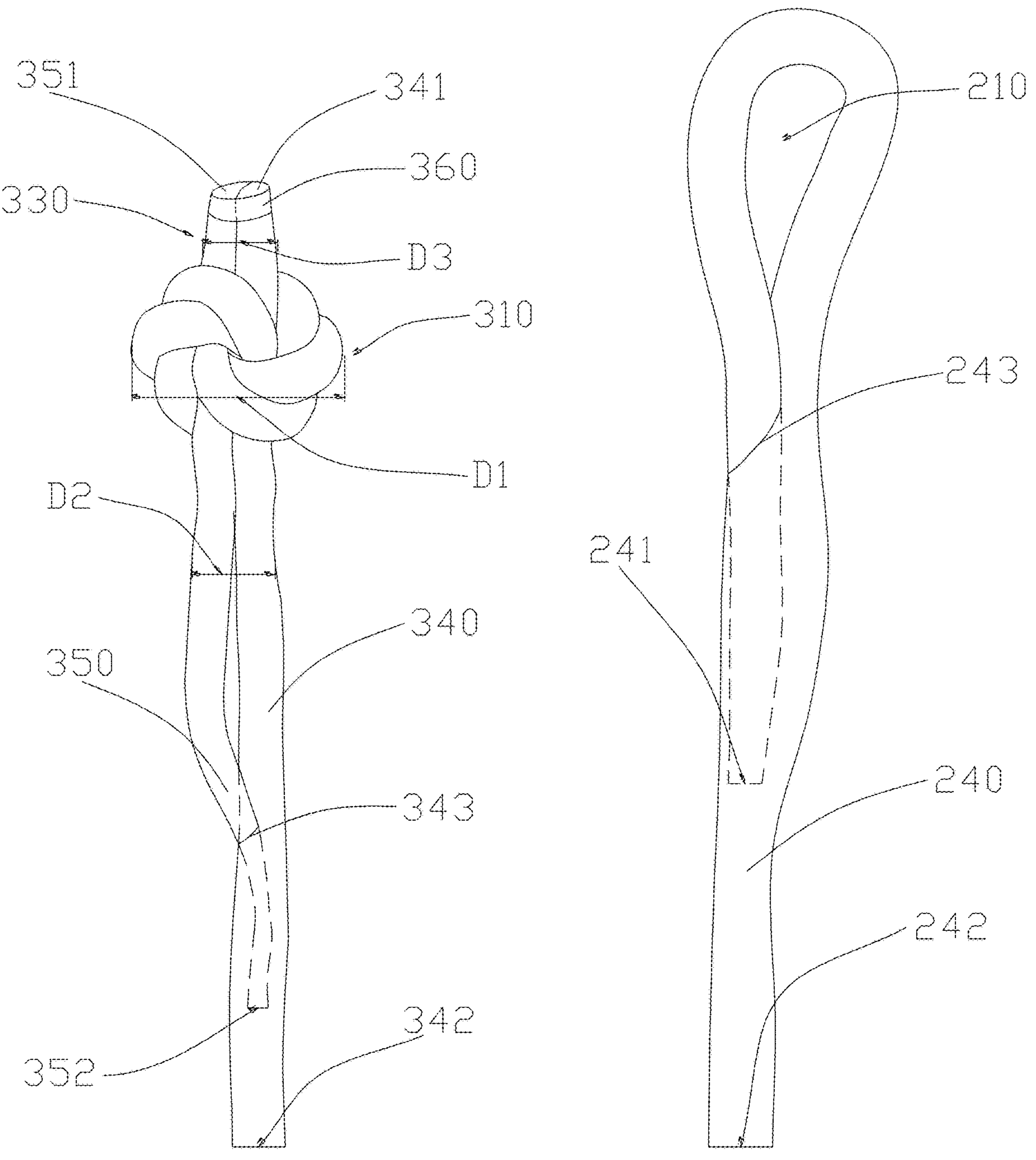
FIG. 9 is a schematic structural diagram of a ring assembly and a knot assembly of the tow rope according to an embodiment of the present disclosure.

In this embodiment, as shown in FIG. 9, both the diameter D3 of the pulling portion 330 and the diameter D2 of the second neck connection part 320 are smaller than the diameter D1 of the knot 310.

In use, the pulling portion 330 is first inserted through the eye loop 210, and then the pulling portion 330 is pulled, causing the outer surface of the knot 310 to press against the inner edge of the eye loop 210. This causes the eye loop 210 to deform into a substantially annular configuration, thereby facilitating passage of the knot 310 through the eye loop 210, which greatly simplifies assembly and use for the user.

Moreover, since the diameter D3 of the pulling portion 330 is smaller than the diameter D1 of the knot 310, it is more convenient for the user to insert the pulling portion 330 into the eye loop 210. Additionally, because the diameter D2 of the second neck connection part 320 is smaller than the diameter D1 of the knot 310, the eye loop 210 can stably abut against both the second end 32*b* of the second neck connection part 320 and the lower surface of the knot 310.

Figure 7:
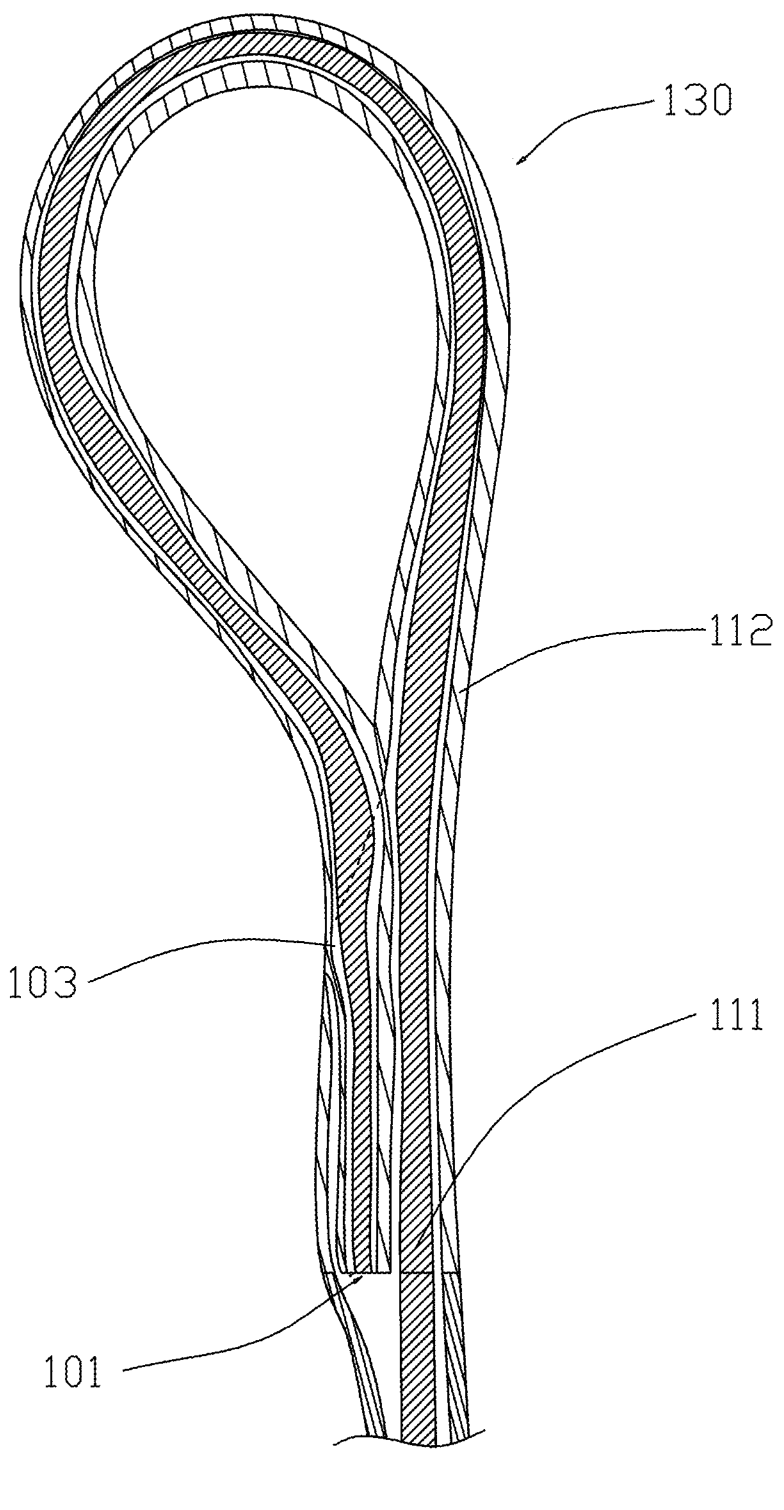
FIG. 7 is a cross-sectional view of a first loop portion of the tow rope according to an embodiment of the present disclosure.

In this embodiment, as shown in FIG. 7, the first end 101 of the rope main body 100 is inserted into the sheath 112 at the first crossing point 103 along the gap between two adjacent second strands 11*b*, thereby leading a portion of the rope main body 100 between the first end 101 and the first crossing point 103 to form the first loop 130.

During manufacture, a first end 101 of the rope main body 100 is inserted into the sheath 112 at the first crossing point 103 along a gap between two adjacent second strands 11*b*, and then the first end 101 of the rope main body 100 is secured using a connecting thread bundle, thereby forming an integral first loop 130. The portion of the rope main body 100 inserted into the sheath 112 achieves full contact with the adjacent sheath 112 and the inner core 111. Relying on frictional force and the binding force provided by the connecting thread bundle, the structure of the first loop 130 becomes more stable. Compared with a knot-based connection structure, this arrangement is stronger, and a surface of the first loop has no protruding knots, resulting in both an aesthetically pleasing appearance and improved ease of use.

Figure 8:
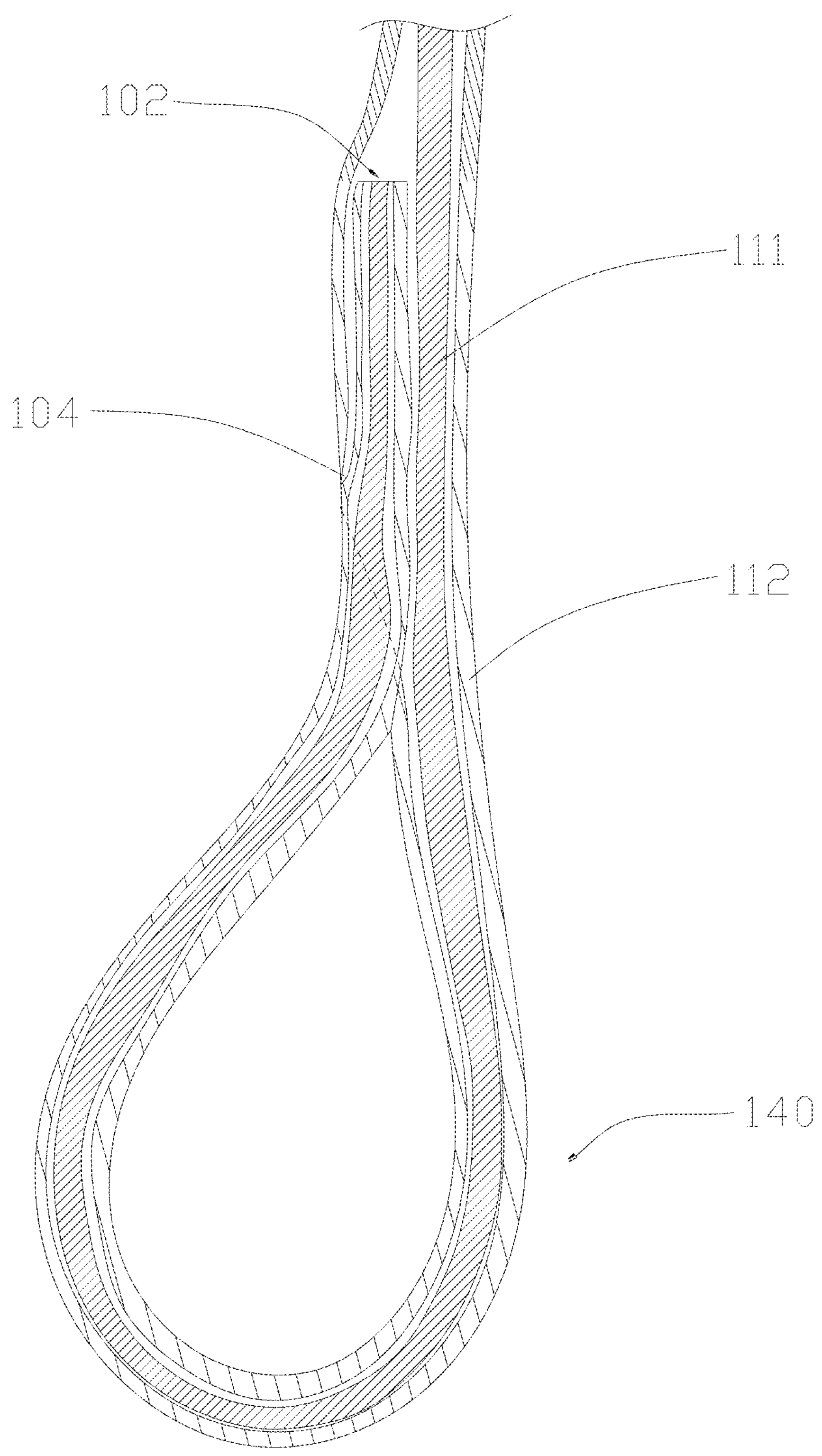
FIG. 8 is a cross-sectional view of a second loop portion of the tow rope according to an embodiment of the present disclosure.

In this embodiment, as shown in FIG. 8, a second end 102 of the rope main body 100 is inserted into the sheath 112 at the second crossing point 104 along the gap between two adjacent second strands 11*b*, and the portion of the rope main body 100 between the second end 102 and the second crossing point 104 forms the second loop 140.

During manufacture, the second end 102 of the rope main body 100 is inserted into the sheath 112 at the second crossing point 104, along the gap between two adjacent second strands 11*b*, and then the second end 102 of the rope main body 100 is secured using a connecting thread bundle, thereby integrally forming the second loop 140. The portion of the rope main body 100 inserted into the sheath 112 achieves full contact with the adjacent sheath 112 and inner core 111. Relying on frictional force and the binding force provided by the connecting thread bundle, the structure of the second loop 140 becomes more stable. Compared with a knot-based connection structure, this arrangement is stronger, and the product surface has no protruding knots, resulting in both an aesthetically pleasing appearance and improved ease of use.

Figure 10:
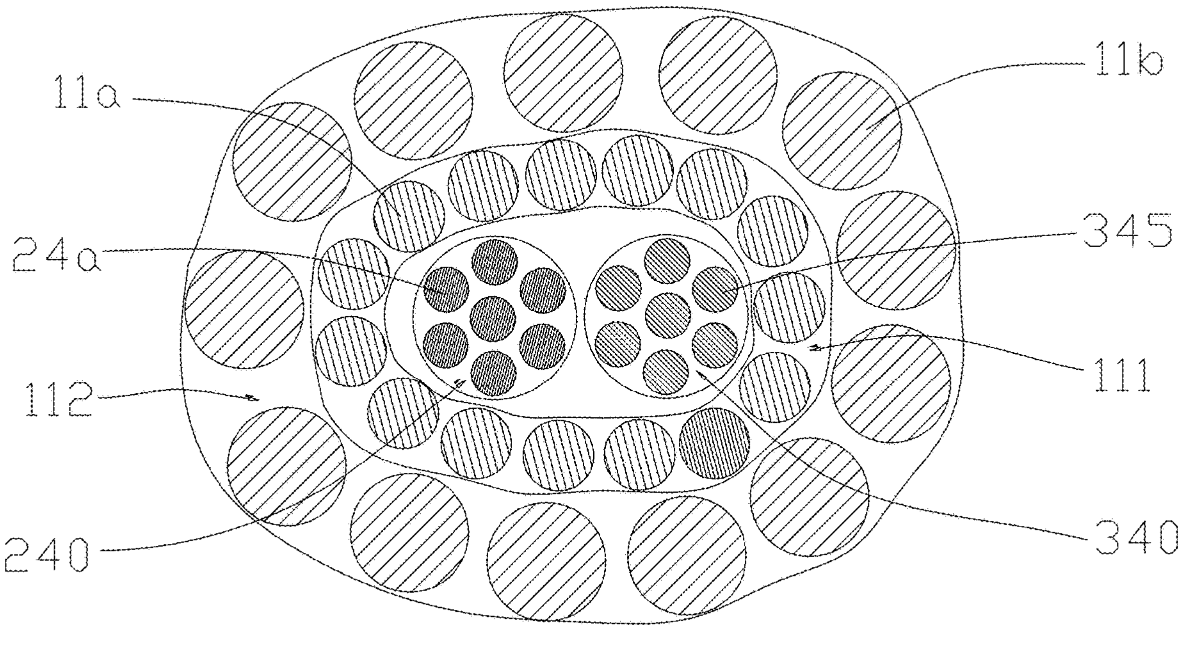
FIG. 10 is a cross-sectional view taken along line A-A in FIG. 1.

In this embodiment, as shown in FIG. 9 and FIG. 10, the ring assembly 200 is formed from a single ring rope body 240. The ring rope body 240 is formed by braiding a plurality of third strands 24*a*. The ring rope body 240 has a first end 241, a second end 242, and a fourth crossing point 243. The first end 241 of the ring rope body 240 is inserted into the interior of the ring rope body 240 at the fourth crossing point 243 along the gap between two adjacent third strands 24*a*, thereby forming the eye loop 210.

In this embodiment, the second end 242 of the ring rope body 240 is inserted, at the third crossing point 105, through the gap between two adjacent second strands 11*b* and the gap between two adjacent first strands 11*a*, into the interior of the sheath 112 and the inner core 111. The portion of the ring rope body 240 located between the third crossing point 105 and the fourth crossing point 243 constitutes the first neck connection part 220.

During manufacturing, the first end 241 of the ring rope body 240 may be inserted, at the fourth crossing point 243, through the gap between two adjacent third strands 24*a* into the interior of the ring rope body 240 itself. Subsequently, a binding thread or yarn is applied to securely fix the first end 241 of the ring rope body 240. This process integrally forms an eye loop 210. A portion of the ring rope body 240 inserted into itself makes sufficient contact with the adjacent third strands 24*a*. By virtue of frictional force and the binding force provided by the binding thread, the structure of the eye loop 210 achieves enhanced stability. Compared with a conventional knot-based connection, this arrangement provides superior structural strength, while the product surface remains free of protruding knots, thereby offering both improved aesthetic appearance and enhanced ease of use.

Thereafter, the second end 242 of the ring rope body 240 is inserted, at the third crossing point 105, through a gap between two adjacent second strands 11*b* and a gap between two adjacent first strands 11*a*, into the interior of the sheath 112 and the inner core 111. A portion of the ring rope body 240 inserted into the sheath 112 and inner core 111 achieves full frictional engagement with both the first strands 11*a* and the second strands 11*b*. Relying on this frictional force combined with the binding force provided by the binding thread, the ring rope body 240 is firmly secured, resulting in a more stable overall product structure.

In this embodiment, as shown in FIG. 9 and FIG. 10, the knot assembly 300 consists of a first knot rope body 340 and a second knot rope body 350. Both the first knot rope body 340 and the second knot rope body 350 are braided from a plurality of fourth strands 345. The first knot rope body 340 includes a first end 341, a second end 342, and a fifth crossing point 343. The second knot rope body 350 includes a first end 351 and a second end 352. The first knot rope body 340 and the second knot rope body 350 are knotted together to form the knot portion 310. A portion of the first knot rope body 340 between its first end 341 and the knot portion 310, together with the portion of the second knot rope body 350 between its first end 351 and the knot portion 310, collectively constitute the pulling portion 330. By knotting the first knot rope body 340 with the second knot rope body 350, a prominent knot portion 310 can be formed in a convenient and rapid manner, thereby achieving high production efficiency and stable structure.

In this embodiment, the second end 352 of the second knot rope body 350 is inserted at the fifth crossing point 343, through the gap between two adjacent fourth strands 345 into the interior of the first knot rope body 340.

In this embodiment, the second end 342 of the first knot rope body 340 is inserted, at the third crossing point 105, through the gap between two adjacent second strands 11*b* and the gap between two adjacent first strands 11*a*, into an interior of the sheath 112 and the inner core 111. The portion of the first knot rope body 340 and the portion of the second knot rope body 350 located between the third crossing point 105 and the fifth crossing point 343 collectively form the second neck connection part 320.

The second end 352 of the second knot rope body 350 is inserted into the first knot rope body 340, such that the inserted portion of the second knot rope body 350 makes sufficient contact with the fourth strands 345 inside the first knot rope body 340. By means of frictional force and the binding force provided by the binding thread, the second end 352 of the second knot rope body 350 is securely fixed to the first knot rope body 340, thereby forming an integral insertion portion. Subsequently, the second end 342 of the first knot rope body 340 together with the integral insertion portion are inserted as a whole into the sheath 112 and the inner core 111. Similarly, relying on frictional force and the binding force provided by the binding thread, stable connection is achieved between the first knot rope body 340, the second knot rope body 350, and the rope main body 100, thereby enhancing the overall strength of the product.

In this embodiment, at least one of the first end 341 of the first knot rope body 340 and the first end 351 of the second knot rope body 350 is provided with a wrapping tape 360. The wrapping tape 360 connects and binds the first end 341 of the first knot rope body 340 and the first end 351 of the second knot rope body 350. The wrapping tape 360 can be only arranged at the first end 341 of the first knot rope body 340, or only at the first end 351 of the second knot rope body 350, or simultaneously arranged at both the first end 341 of the first knot rope body 340 and the first end 351 of the second knot rope body 350. The wrapping tape 360 joins the first end 341 of the first knot rope body 340 and the first end 351 of the second knot rope body 350, making it easier for the user to insert the pulling portion 330 into the eye loop 210 and thereby improving overall usability. Additionally, the wrapping tape 360 restrains the plurality of fourth strands 345 constituting the first knot rope body 340 and the second knot rope body 350, preventing loosening or unraveling thereof.

In this embodiment, the surface of the rope main body 100 is coated with a coating layer, the coating layer includes at least one of waterborne polyurethane, waterborne acrylic resin, waterborne polyester resin, waterborne silicone-containing resin, waterborne fluorine-containing resin, waterborne amino resin, waterborne alkyd resin, waterborne epoxy resin, waterborne phenolic resin, waterborne oil, waterborne polybutadiene, and waterborne hyperbranched polymer.

Applying a polyurethane-based coating (or other waterborne resin coating as listed) to the surface of the rope main body 100 represents an important functional optimization of the present solution. This coating forms a strong, continuous, and elastic protective film on the surface of the rope body. Its primary has the following functions.

Significantly improving a surface abrasion resistance, thereby protecting the plurality of second strands 110 from damage caused by friction and scraping during use and extending the overall service life of the tow rope.

Enhancing environmental resistance, effectively blocking penetration of moisture, salt spray, ultraviolet radiation, and certain chemicals into the internal fibers, thereby broadening the applicability of the tow rope in harsh environments such as outdoor, marine, or industrial settings.

Improving surface properties and handling characteristics, rendering the surface of the tow rope smoother and more lubricious, reducing drag during use, and potentially providing certain antistatic properties.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A tow rope, comprising:

a rope main body having a first crossing point, a second crossing point, and a third crossing point;

a first loop is formed at and connected to the first crossing point; a second loop is formed at and connected to the second crossing point;

wherein at least one of the first loop and the second loop is configured to be secured to one of an object to be towed and a towing device;

wherein a distance between an end of the first loop remote from the third crossing point and the third crossing point is L1, and a distance between an end of the second loop remote from the third crossing point and the third crossing point is L2, with L1>L2;

a ring assembly connected to the third crossing point;

a knot assembly connected to the third crossing point and arranged adjacent to the ring assembly;

wherein the knot assembly is releasably engaged with the ring assembly to form a third loop, and the third loop is configured to selectively connect to another one of the object to be towed and the towing device, the first loop, or the second loop;

wherein, when the third loop is connected to the first loop, the first loop, a first rope segment of the rope main body, and the third loop together enclose and form a fourth loop, and wherein the fourth loop is configured to be secured to another one of the object to be towed and the towing device;

wherein, when the third loop is connected to the second loop, the second loop, a second rope segment of the rope main body, and the third loop together enclose and form a fifth loop, and wherein the fifth loop is configured to be secured to another one of the object to be towed and the towing device.

2. The tow rope according to claim 1, wherein the rope main body is formed by braiding a plurality of strands, and the rope main body is substantially cylindrical in shape.

3. The tow rope according to claim 2, wherein the plurality of strands comprises a plurality of first strands made of a first material and a plurality of second strands made of a second material;

wherein the plurality of first strands is braided to form an inner core, the plurality of second strands is braided to form a sheath, and the inner core is disposed inside the sheath.

4. The tow rope according to claim 1, wherein a ratio of L1 to L2 is in a range of 1.5 to 1.9.

5. The tow rope according to claim 3, wherein the ring assembly comprises an eye loop and a first neck connection part, the knot assembly comprises a knot and a second neck connection part;

wherein a first end of the first neck connection part is connected to the rope main body, and a second end of the first neck connection part extends outwardly from the third crossing point and is connected to the eye loop;

wherein a first end of the second neck connection part is connected to the rope main body, and a second end of the second neck connection part extends outwardly from the third crossing point and is connected to the knot;

wherein the knot is configured to be releasably passed through the eye loop.

6. The tow rope according to claim 5, wherein an inner perimeter of the eye loop is approximately equal to an outer perimeter of the knot.

7. The tow rope according to claim 5, wherein the knot assembly further comprises a pulling portion, and the pulling portion is connected to the knot and extends outwardly in a direction away from the second neck connection part.

8. The tow rope according to claim 7, wherein a diameter of the pulling portion and a diameter of the second neck connection part are both smaller than a diameter of the knot.

9. The tow rope according to claim 3, wherein a first end of the rope main body is inserted into the sheath at the first crossing point through a gap between two adjacent second strands, thereby leading a portion of the rope main body between the first end and the first crossing point to form the first loop.

10. The tow rope according to claim 3, wherein a second end of the rope main body is inserted into the sheath at the second crossing point through a gap between two adjacent second strands, thereby leading a portion of the rope main body between the second end and the second crossing point to form the second loop.

11. The tow rope according to claim 5, wherein the ring assembly is made of a noose rope body, the noose rope body is formed by braiding a plurality of third strands;

the noose rope body comprises a first end, a second end, and a fourth crossing point;

wherein the first end of the noose rope body is inserted into the noose rope body at the fourth crossing point through a gap between two adjacent third strands, thereby forming the eye loop.

12. The tow rope according to claim 11, wherein the second end of the noose rope body is inserted into the sheath and the inner core at the third crossing point through a gap between two adjacent second strands and a gap between two adjacent first strands, thereby leading a portion of the noose rope body between the third crossing point and the fourth crossing point to form the first neck connection part.

13. The tow rope according to claim 7, wherein the knot assembly comprise a first knot rope body and a second knot rope body, both the first knot rope body and the second knot rope body are formed by braiding a plurality of fourth strands;

wherein the first knot rope body comprises a first end, a second end, and a fifth crossing point;

the second knot rope body comprises a first end and a second end;

wherein the first knot rope body and the second knot rope body are knotted together to form the knot;

and a portion between the first end of the first knot rope body and the knot together with a portion between the first end of the second knot rope body and the knot jointly form the pulling portion.

14. The tow rope according to claim 13, wherein the second end of the second knot rope body is inserted into the first knot rope body at the fifth crossing point through a gap between two adjacent fourth strands.

15. The tow rope according to claim 14, wherein the second end of the first knot rope body is inserted into the sheath and the inner core at the third crossing point through a gap between two adjacent second strands and a gap between two adjacent first strands, thereby allowing a portion between the first knot rope body and the second knot rope body and a portion between the third crossing point and the fifth crossing point to form the second neck connection part.

16. The tow rope according to claim 13, wherein at least one of the first end of the first knot rope body and the first end of the second knot rope body is provided with a wrapping tape, the wrapping tape is configured to connect the first end of the first knot rope body and the first end of the second knot rope body.

17. The tow rope according to claim 1, wherein a surface of the rope main body is coated with a coating layer;

wherein the coating layer comprises at least one of waterborne polyurethane, waterborne acrylic resin, waterborne polyester resin, waterborne silicone-containing resin, waterborne fluorine-containing resin, waterborne amino resin, waterborne alkyd resin, waterborne epoxy resin, waterborne phenolic resin, waterborne oil, waterborne polybutadiene, and waterborne hyperbranched polymer.

* * * * *